(12) United States Patent
Masaki et al.

(10) Patent No.: US 6,642,892 B2
(45) Date of Patent: Nov. 4, 2003

(54) ANTENNA AND ELECTRONIC DEVICE CONTAINING THE SAME

(75) Inventors: Toshiyuki Masaki, Fukaya (JP); Masao Teshima, Fuchu (JP); Chihei Kitahara, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 86 days.

(21) Appl. No.: 09/953,886

(22) Filed: Sep. 18, 2001

(65) Prior Publication Data

US 2002/0054495 A1 May 9, 2002

(30) Foreign Application Priority Data

Nov. 8, 2000 (JP) .......................................... 2000-340910

(51) Int. Cl.⁷ ................................................. H01Q 1/24
(52) U.S. Cl. ............................... 343/702; 343/700 MS; 361/683
(58) Field of Search ........................... 343/702, 700 MS, 343/872; 361/687, 683, 681; H01Q 1/24

(56) References Cited

U.S. PATENT DOCUMENTS

| | | | |
|---|---|---|---|
| 5,677,698 A | | 10/1997 | Snowdon |
| 6,124,831 A | * | 9/2000 | Rutkowski et al. .. 343/700 MS |
| 6,285,328 B1 | | 9/2001 | Masaki et al. |
| 6,339,400 B1 | * | 1/2002 | Flint et al. ................... 343/702 |
| 6,426,724 B2 | * | 7/2002 | Gunee et al. ................ 343/702 |
| 6,509,877 B2 | * | 1/2003 | Masaki ........................ 343/702 |
| 2002/0021251 A1 | * | 2/2002 | Honda ......................... 343/702 |

OTHER PUBLICATIONS

Masaki, T., "Radio Communication Device and Electronic Apparatus Having the Same", U.S. Ser. No.: 09/730,554, Filed: Dec. 7, 2000, Specification—35 pages, and 8 sheets of drawings.

* cited by examiner

*Primary Examiner*—Hoanganh Le
(74) *Attorney, Agent, or Firm*—Finnegan, Henderson, Farabow, Garrett & Dunner, L.L.P.

(57) ABSTRACT

An electronic device comprises a pair of diversity antenna modules of a first wireless communication scheme placed near the left and right ends of a display unit, and an antenna module of a second wireless communication scheme placed between the pair of diversity antenna modules. Each antenna module comprises a flexible substrate and an antenna provided on the substrate, in which a portion of the substrate having the antenna thereon projects from the upper end of the display unit is folded toward the front side of the display unit.

42 Claims, 6 Drawing Sheets

ANTENNA AND ELECTRONIC DEVICE CONTAINING THE SAME

CROSS-REFERENCE TO RELATED APPLICATIONS

This application is based upon and claims the benefit of priority from the prior Japanese Patent Application No. 2000-340910, filed Nov. 8, 2000, the entire contents of which are incorporated herein by reference.

BACKGROUND OF THE INVENTION

1. Field of the Invention

The present invention relates to an antenna and an electronic device containing the antenna, and more particularly, to an antenna module using a chip antenna and an electronic device such as a personal computer containing the antenna module within a housing of a display unit.

2. Description of the Related Art

In recent years, a notebook type personal computer containing an antenna has become commercially practical to realize a wireless communication function. An example thereof is U.S. Pat. No. 5,677,698 (Snowdon) which employs, as an antenna, a slot antenna comprising a copper foil having a rectangular slot formed therein. The antenna is mounted behind a display on an inner surface of a lid of a notebook type personal computer through an adhesive coating on the rear surface of the antenna. Since a housing of the notebook type personal computer is made of a dielectric material, the effective length of the antenna is advantageously increased and the slot is correspondingly reduced in length. Thus, the antenna is compact in size. For use in an office or the like where a number of reflected waves or interference waves are assumed, two antennas are mounted perpendicularly and close to each other to realize an antenna of a diversity system.

Since the antenna is mounted behind the display, it produces more radiation on the back side of the display while it produces less radiation on the display surface side. In other words, the directivity is high on the back side and low on the display surface side. When the antenna is applied to a wireless LAN or the like, it is desirable for the antenna to have a non-directional radiation characteristic to allow communication regardless of the orientation of the personal computer.

The lid where the antenna is placed has little space for mounting, and the mounting of the antenna causes an increased thickness of the lid, although a reduction in thickness is required for the lid. In addition, a display panel is made of metal and the antenna is desirably spaced from the panel to some extent, which restricts free design of the shape of the end portion of the lid housing (such as a rounded form or the like).

In recent years, a number of industry organizations have developed and published a plurality of wireless communication schemes for wireless local area networks "LANs", such as the Institute of Electrical and Electronics Engineers ("IEEE") 802.11a and 802.11b standards. In addition, a number of industry consortiums also developed and published wireless communication schemes for short-distance wireless communication, such as the "Bluetooth" standard. These communication schemes set forth the technical specifications governing the wireless exchange of information between electronic devices. Most of these wireless communication schemes exhibit a need for mounting a number of antennas to accommodate them. In this case, a plurality of antennas are mounted on a small area, and depending on positional relationships between the antennas, interference may occur between them or the diversity effect may be reduced.

In this manner, an antenna contained in a conventional electronic device has the disadvantage of a radiation characteristic directed to a particular direction depending on the mounting location to fail to realize a non-directional radiation characteristic. In addition, the antenna contained in the device causes the disadvantages of an increased thickness of the housing and a reduced degree of freedom in the design of the shape of the housing. Furthermore, when a plurality of antennas are mounted to accommodate a plurality of wireless communication schemes, such problems occurs as interference between the antennas, a reduced effect of the diversity system, and the like.

BRIEF SUMMARY OF THE INVENTION

It is an object of the present invention to provide an antenna suitably contained in a small and thin electronic device, for example in a display unit of a portable electronic device.

An antenna according to an aspect of the present invention comprises a substrate and an antenna mounted on the substrate, wherein a portion of the substrate having the antenna thereon can be bent with respect to the remaining portion.

With such a structure, when the antenna is mounted in a housing of an electronic device, the antenna can be spaced from a metal material without extending space for the mounting, and restrictions can be prevented on the housing structure or the outer design.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an antenna and an electronic device containing the antenna according to the present invention will now be described with reference to the accompanying drawings.

First Embodiment

Figure 1:
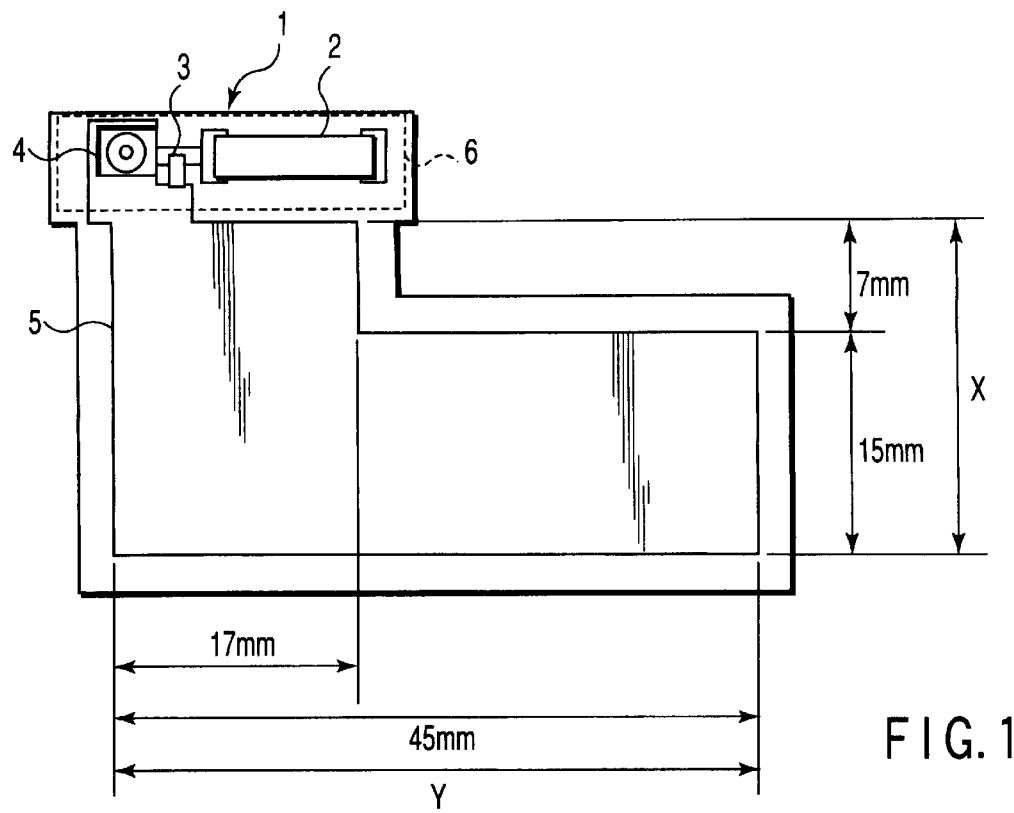
FIG. 1 is a diagram showing an antenna according to a first embodiment of the present invention.

FIG. 1 is a diagram showing an antenna module according to the first embodiment of the present invention. The antenna module of the embodiment comprises a flexible printed board (hereinafter referred to as "FPC substrate") 1 made of a flexible material such as polyimide, an antenna 2 provided on a surface of the FPC substrate 1, an inductor 3 for impedance matching, a coaxial connector 4 for connecting the antenna 2 to a separate transmitting/receiving circuit module through a coaxial cable, a ground conductor 5 formed of a conductive pattern, and a reinforcing plate 6 provided on the back of the FPC substrate 1 and made of glass epoxy.

A chip antenna which can be used as the antenna 2 may have an extremely small rectangular parallelepiped shape of several millimeters by several millimeters in cross-sectional dimension and one centimeter or less in length. Specifically, a conductor serving as an antenna pattern is wound helically along its longitudinal direction within a small insulating chip of rectangular parallelepiped shape mainly made from barium oxide, aluminum oxide, and silica, in which a resistor is provided on a surface of the chip with its one end connected to the conductor. A feeding terminal is also provided on the surface of the chip for applying voltage to the conductor through the other end of the resistor.

The chip antenna provides a band of approximately 100 MHz, and the ground conductor 5 is provided for providing a wider band when a radio frequency beyond 100 MHz is used. The ground conductor 5 comprises an L-shaped copper foil formed by cutting a portion of a rectangular as shown in FIG. 1. The realization of a wider band requires resonance of the ground conductor 5 itself at the radio frequency used. It is thus necessary for the ground conductor 5 to have a total perimeter close to one wavelength of the radio frequency. Specifically, the total perimeter of the ground conductor 5 may be set in a range of approximately 0.7 to approximately 1.4 of the wavelength of the radio frequency, preferably in a range of approximately 0.8 to approximately 1.25, and more preferably in a range of approximately 0.85 to approximately 1.05.

The reason why such ranges are preferable is described below. An experiment was conducted with an antenna accommodating "Bluetooth" which is a short-distance wireless communication scheme. The frequency available in the scheme ranges 2,400 MHz (wavelength: 125 mm) to 2,483.5 MHz (wavelength: 120.8 mm). The frequency bands measured for various total perimeters are shown in a table below. A conventional antenna without the ground conductor 5 provides a band of approximately 100 MHz.

TABLE

| SIZE X × Y(mm) | TOTAL PERIMETER (mm) | FREQUENCY BAND (MHz) | EFFECT |
|---|---|---|---|
| 20 × 45 | 130 | 358 | HIGH |
| 20 × 35 | 110 | 201 | HIGH |
| 20 × 25 | 90 | 147 | LOW |
| 30 × 25 | 110 | 287 | HIGH |
| 40 × 25 | 130 | 371 | HIGH |
| 50 × 25 | 150 | 190 | HIGH |
| 60 × 25 | 170 | 127 | LOW |

From the results, when the ground conductor 5 has a size of X=20 mm and Y=45 mm (perimeter: 130 mm), the frequency band of 358 MHz is provided and a prominent effect can be seen over 100 MHz. When the ground conductor 5 has the size of X=20 mm and Y=35 mm (perimeter: 110 mm), the frequency band of 201 MHz is provided and an apparent effect can also be seen. When X is 20 mm and Y is 25 mm (perimeter: 90 mm), the frequency band of 147 MHz is provided and the effect can be seen but is small as compared with the conventional frequency band of 100 MHz.

When X is 30 mm and Y is 25 mm (perimeter: 110 mm), the frequency band of 287 MHz is provided and a sufficient effect can be seen. When X is 40 mm and Y is 25 mm (perimeter: 130 mm), the frequency band of 374 MHz is provided and a sufficient effect can be seen. When X is 50 mm and Y is 25 mm (perimeter: 150 mm), the frequency band of 190 MHz is provided and a favorable effect can be seen. When X is 60 mm and Y is 25 mm (perimeter: 170 mm), the frequency band of 127 MHz is provided and the effect can be seen but is small as compared with the conventional frequency band of 100 MHz.

The experimental results mentioned above show that, when the ground conductor 5 has a total perimeter close to a wavelength of a radio frequency of 2,400 MHz to 2,483.5 MHz, the frequency band ranges from 374 MHz to 190 MHz and 3.7 to 1.9 times greater than the conventional one, and a wider band can be advantageously achieved.

Therefore, it can be said that the value of the total perimeter of the ground conductor 5 close to one wavelength of the radio frequency used produces a remarkable effect for a wider band. It is believed that although the antenna 2 alone can ensure a band of approximately 100 MHz at most, a band of approximately 350 MHz can be obtained by the total perimeter of the ground conductor 5 close to one wavelength of the radio frequency used because the ground conductor 5 causes a resonance phenomenon in the radio frequency band.

In "Bluetooth" scheme using the frequency band of 2,400 MHz to 2,483.5 MHz, an effective total perimeter for obtaining a sufficient effect is 110 mm to 150 mm. When this is considered in terms of a wavelength range, a sufficiently favorable range is approximately 0.88 (110 mm/125 mm=0.88) to approximately 1.24 (150 mm/121 mm=1.239) wavelengths. Also, total perimeters 90 mm and 170 mm can, but not sufficiently, increase a band characteristic than conventional. The wavelengths for those perimeters are 0.72 (90 mm/125 mm=0.72) for 90 mm and 1.40 (170 mm/121 mm=1.40) for 170 mm, and thus it is acceptable that an effective total perimeter with a recognized effect ranges from approximately 0.7 to approximately 1.4 wavelengths. From the aforementioned facts, the total perimeter of the ground conductor 5 may be set to approximately one wavelength of a frequency in the band used, specifically in a range of approximately 0.7 to approximately 1.4, preferably in a range of approximately 0.8 to approximately 1.25, and more preferably in a range of approximately 0.85 to approximately 1.05.

The FPC substrate 1 is made of a flexible material to increase the degree of freedom in mounting the antenna module, and it need not be flexible all over the substrate. It is essential only that at least portions of the FPC substrate 1 having the antenna 2, the inductor 3, and the coaxial connector 4 formed thereon may be folded back toward the remaining portion. Thus, two substrates each formed of a rigid substrate such as a glass epoxy substrate may be connected to each other with the FPC substrate of the embodiment. As shown in broken lines in FIG. 1, since the coaxial connector 4 is placed at the folding portion, the reinforcing plate 6 is affixed to the back of the FPC substrate 1. The reinforcing plate 6 not only ensures the connection of the coaxial connector 4 with the coaxial cable but also improves workability in mounting the antenna module.

Figure 2:
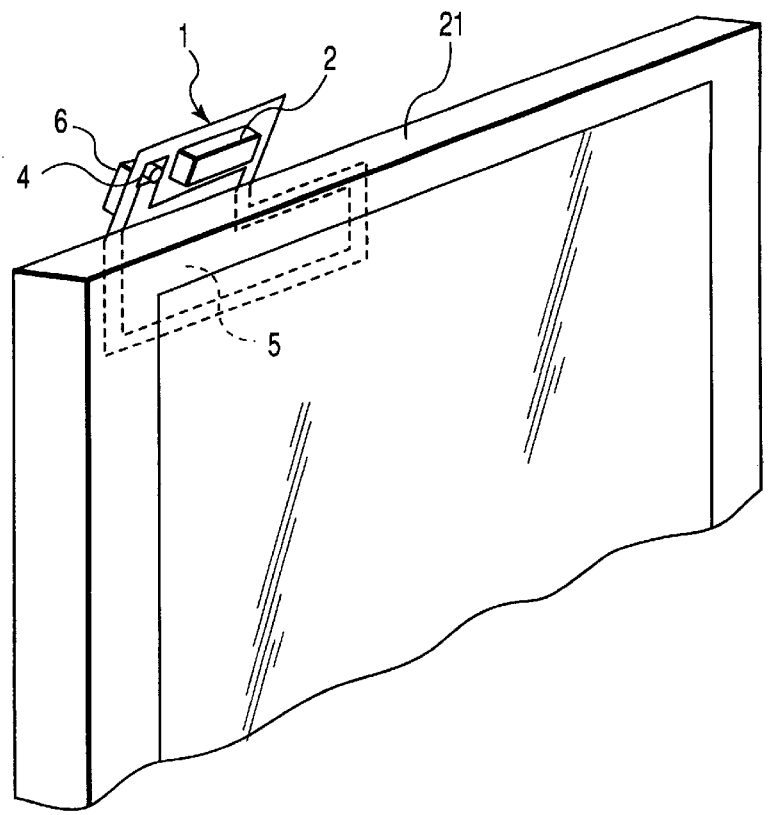
FIG. 2 is a perspective view illustrating how the antenna of the first embodiment is mounted on the back of a liquid crystal panel of a notebook type personal computer.

Next, description is made on an example of mounting the antenna module of the first embodiment to an electronic device. This example will be described for mounting of the antenna module in a notebook type personal computer. FIG. 2 shows a liquid crystal panel 21 in a liquid crystal display unit as a lid which can be freely opened and closed. The FPC substrate 1 (the ground conductor 5 portion) is attached to the upper end of the back of the liquid crystal panel 21. The attachment to the panel 21 is performed with a double-faced tape, by way of example. The portion of the antenna module formed with the antenna 2, the inductor 3 (not shown in FIG. 2), and the coaxial connector 4 projects from the upper end of the back of the liquid crystal panel 21 and is folded slightly toward the display surface of the liquid crystal panel 21. The reinforcing plate 6 made of glass epoxy is attached to the back of that portion. The mounting of the FPC substrate 1 is not limited thereto and the FPC substrate 1 may be attached to a housing of the panel 21. Since the antenna 2 is mounted such that it projects from the liquid crystal panel 21 in this manner, the antenna 2 can produce radiation equally to the front and back of the liquid crystal panel 21 to realize a non-directional antenna.

Figure 3:
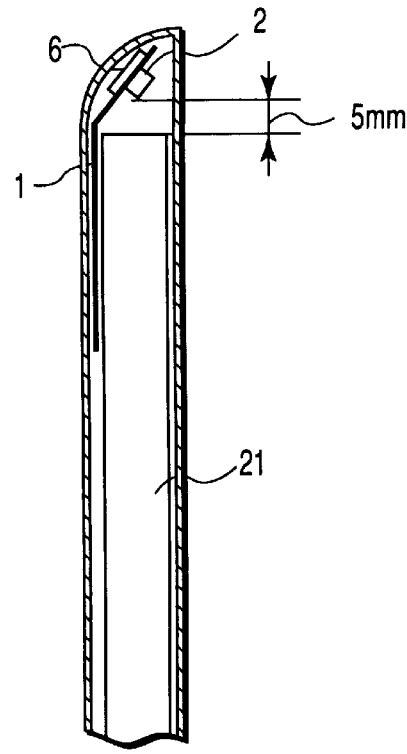
FIG. 3 is a sectional view illustrating how the antenna of the first embodiment is mounted on the back of the liquid crystal panel of the notebook type personal computer.

FIG. 3 is a sectional view of the end portion (the upper end of the liquid crystal panel 21) of the liquid crystal display unit on which the antenna is mounted. Since the liquid crystal panel 21 is made of a conductor, the antenna 2 cannot radiate radio waves when the liquid crystal panel 21 is close to the antenna 2. It is thus necessary for the antenna 2 to be spaced from the upper end of the liquid crystal panel 21 to some extent for ensuring a desired radiation characteristic. FIG. 3 shows the antenna 2 spaced approximately 5 mm from the upper end of the liquid crystal panel 21. With such a structure, since the FPC substrate 1 has a thickness of approximately 0.3 mm, an increased thickness of the housing of the display unit can be minimized even when the antenna is mounted within the housing. In addition, since the placement of the antenna folded toward the display surface of the liquid crystal panel allows a reduced thickness of the end portion of the housing of the liquid crystal display unit as well as a reduced volume, a weight reduction can be achieved. Moreover, since the antenna is placed such that it is folded, the end portion of the housing of the liquid crystal display unit is easily made rounded, and the degree of freedom in design is hardly impaired by containing the antenna within the housing.

As described above, according to the first embodiment, since the FPC substrate is placed on the back of the liquid crystal panel such that the antenna projects from the display panel and is folded toward the display surface of the display panel, the antenna element can be spaced from the metal of the panel without extending mounting space, and the end portion of the housing of the liquid crystal display unit can be reduced in thickness without putting restrictions on the housing structure or its outer design. A reduced weight can be achieved due to a reduction in mounting volume. The degree of freedom is hardly impaired in design to allow a thinned end portion, rounded end portion of the housing of the liquid crystal display unit and the like.

Since the substrate is formed through printing with the conductive pattern for ground with a total perimeter of approximately 0.7 to 1.4 wavelengths, the antenna can provide a wider frequency band.

The chip antenna element used as an antenna element has the helical antenna pattern contained in the insulating chip, and thus the antenna module can be mounted readily within a small housing of an electronic device.

Since the substrate comprises a terminal for connecting the antenna element with a separate circuit module, the module for a transmitting/receiving circuit can be provided separately from the antenna, thereby making it possible to mount the antenna within a housing of an electronic device without extending space for mounting the antenna.

Since the substrate includes the reinforcing plate for reinforcing the portion including the antenna element, it is possible to compensate for a lower strength when the antenna portion is folded.

While the description has been made with the FPC substrate used as an antenna substrate, a fixed substrate previously folded in such a shape as shown in FIG. 3 may be used.

In the following, other embodiments of the present invention will be described. In the description of the other embodiments, the portions identical to those in the first embodiment are designated the same reference numerals and detailed description thereon is omitted.

Second Embodiment

Figure 4:
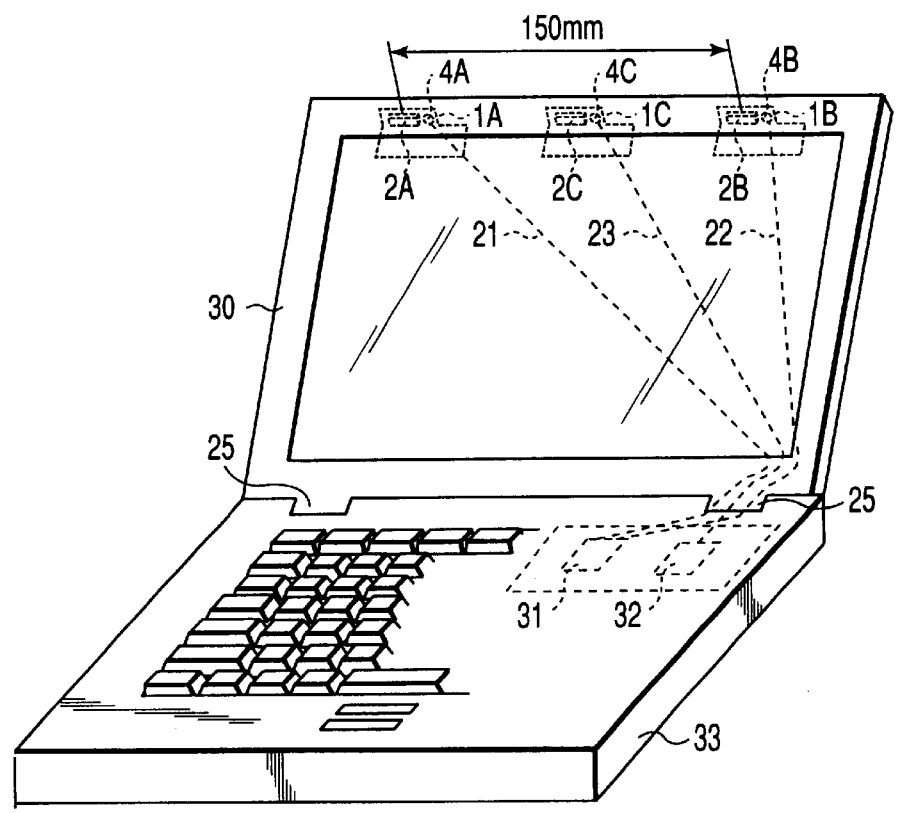
FIG. 4 is a perspective view showing a notebook type personal computer according to a second embodiment of the present invention in which the antenna of the first embodiment is implemented as antennas of IEEE 802.11b scheme and an antenna for "Bluetooth"

FIG. 4 shows a notebook type personal computer as the second embodiment of the present invention containing a plurality of antennas to accommodate a plurality of wireless communication schemes. As the plurality of schemes, described herein are IEEE 802.11b scheme for a wireless LAN and "Bluetooth" scheme which is a short-distance wireless communication scheme both for a band of 2.4 GHz. For IEEE 802.11b scheme, two antennas are used to provide a diversity antenna for reducing the influence of reflected waves.

A liquid crystal display unit 30 is pivotally attached to the distal end of a main body 33 of the notebook type personal computer through a hinge 25. Three FPC substrates 1A to 1C are mounted in an end portion within a housing of the display unit 30 (the upper end of the liquid crystal panel). The FPC substrates 1A and 1B have diversity antennas 2A and 2B of IEEE 802.11b scheme mounted thereon, respectively, while the FPC substrate 1C has an antenna 2C for "Bluetooth" mounted thereon. In other words, the FPC substrate 1C for "Bluetooth" antenna is disposed between the FPC substrates 1A and 1B for IEEE 802.11b antennas. The FPC substrates 1A to 1C are mounted in such a manner as shown in FIGS. 2 and 3. A magnesium alloy or the like may be used as a material for both housings of main body 33 and display unit 30.

It is necessary that the distance between the antennas 2A and 2B for IEEE 802.11b is larger than $(\frac{3}{4})\lambda$ and equal to $\{(2n+1)/4\}\lambda$ (n=1, 2, 3, . . . ) to produce an diversity effect. For an A4-sized notebook type personal computer, one of n=2, n=3, and n=4 is set, while one of n=2 and n=3 is set for a B5-sized notebook type personal computer.

In FIG. 4, two antennas 2A and 2B are spaced from each other with a distance of approximately 150 mm (n=2 at 2.4 GHz to 2.5 GHz) between them.

Since "Bluetooth" which is a short-distance wireless communication scheme provides a low-cost wireless communication function and thus a diversity function for a wireless LAN or the like is omitted in the standard, only one antenna 2C is mounted. The antenna 2C is desirably placed in a central portion of the housing to realize a non-directional characteristic. For this reason, as shown in FIG. 4, "Bluetooth" antenna 2C is disposed between two wireless LAN antennas 2A and 2B. The "Bluetooth" antenna 2C, however, may be a diversity antenna.

Wireless transmitting/receiving circuit modules in accordance with the respective communication schemes are realized as mini PCI cards. Specifically, a wireless LAN transmitting/receiving circuit module 31 and a "Bluetooth" transmitting/receiving circuit module 32 are contained in the main body 33. Coaxial cables 21, 22, and 23 have one ends connected to coaxial connectors 4A, 4B, and 4C on the FPC substrates 1A, 1B, and 1C, respectively, and the other ends connected to the transmitting/receiving circuit modules 31 and 32 through the hinge 25. Such a configuration allows the thick circuit modules to be contained in the main body 33 to realize a reduced thickness of the housing of the display unit 30 on which the antennas are mounted.

Figure 5:
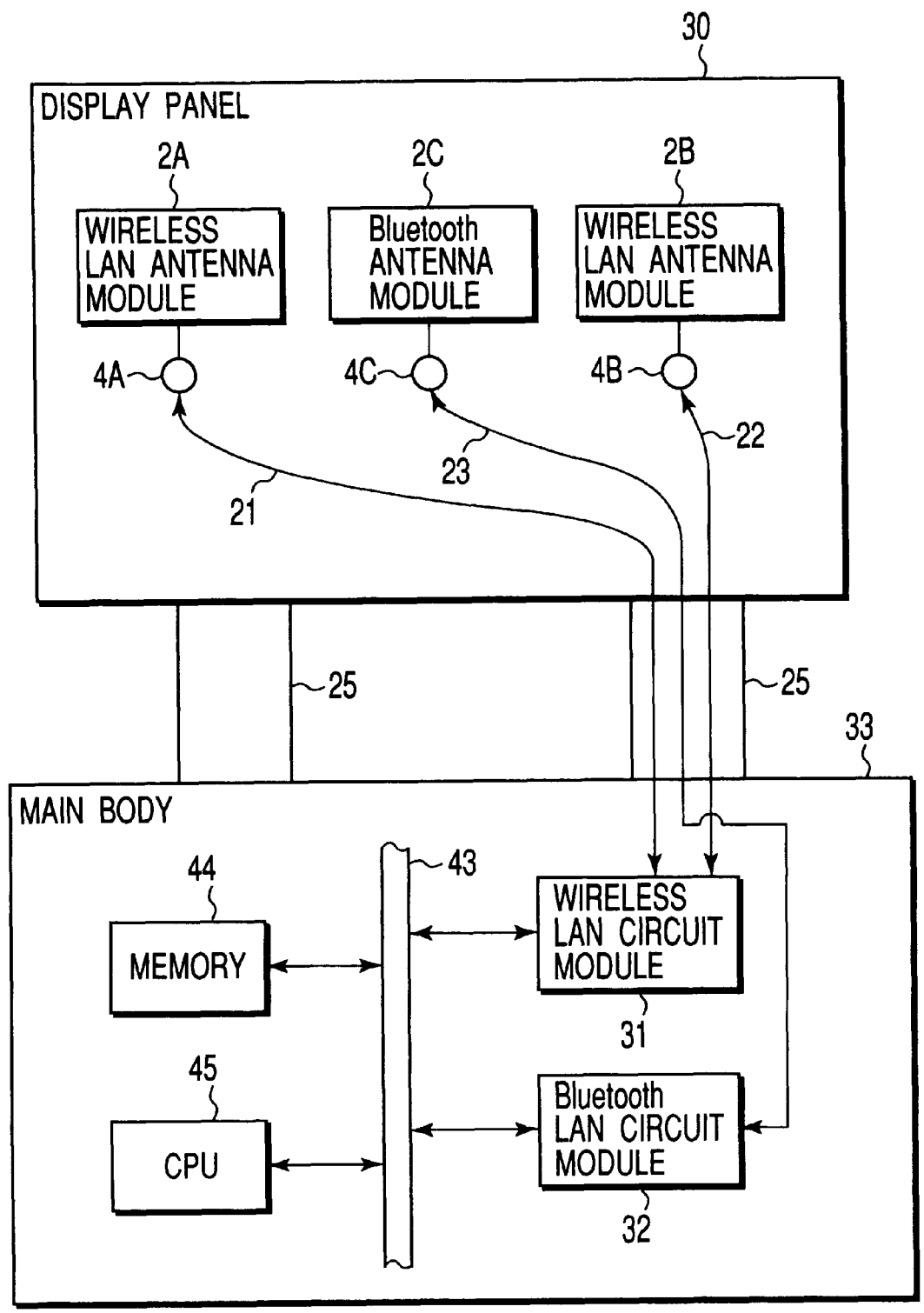
FIG. 5 is a block diagram showing the hardware of the notebook type personal computer shown in FIG. 4.

FIG. 5 shows the hardware of the notebook type personal computer shown in FIG. 4. FIG. 5 shows only portions related to the embodiment and does not show a keyboard controller, a display controller and the like which provide essential functions of a notebook type personal computer.

The wireless LAN antennas 2A and 2B mounted on the back side of the liquid crystal panel of the display unit 30 are connected to the wireless LAN transmitting/receiving circuit module 31 through the coaxial cables 21 and 22 connected to the coaxial connectors 4A and 4B. The "Bluetooth" antenna 2C is connected to "Bluetooth" transmitting/receiving circuit module 32 through the coaxial cable 23 connected to the coaxial connector 4C.

The wireless LAN transmitting/receiving circuit module 31 and "Bluetooth" transmitting/receiving circuit module 32 are connected to a CPU bus 43. The CPU bus 43 is connected to a CPU 45 responsible for control of the entire notebook type personal computer and to a memory 44 for storing data received from the wireless LAN antennas 2A, 2B and "Bluetooth" antenna 2C, and data to be transmitted to the wireless LAN antennas 2A, 2B and "Bluetooth" antenna 2C.

Figure 6:
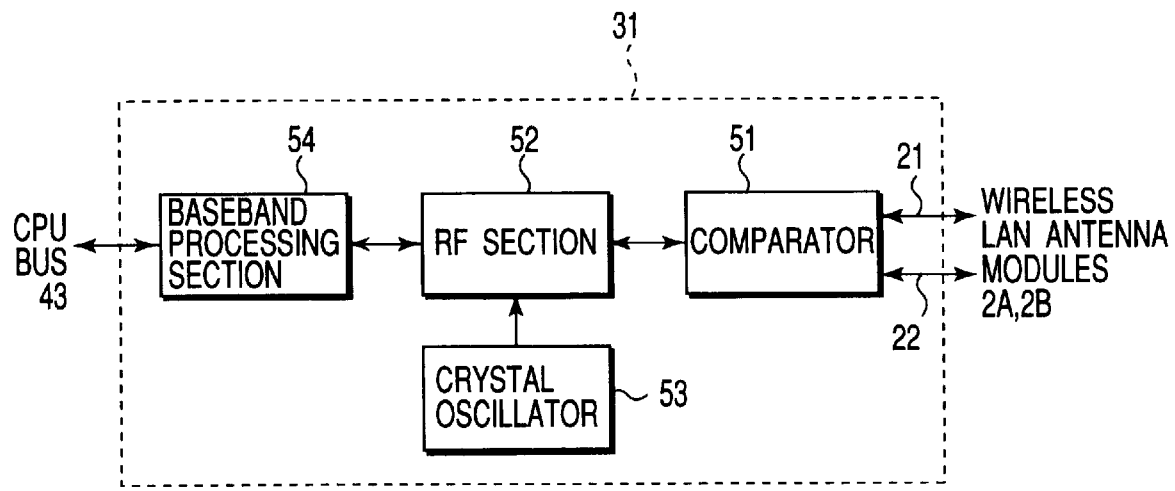
FIG. 6 is a block diagram showing the hardware of a circuit module for a wireless LAN in FIG. 5.

FIG. 6 is a block diagram showing the configuration of the wireless LAN circuit module 31. The wireless LAN circuit module 31 comprises a comparator 51, an RF section 52, a crystal oscillator 53, and a baseband processing section 54.

The comparator 51 compares the levels of two high frequency signals input thereto from the wireless LAN antennas 2A and 2B through the coaxial cables 21 and 22, and outputs the high frequency signal at a higher signal level to the RF section 52. The comparator 51 also outputs the high frequency signal output from the RF section 52 to the wireless LAN antennas 2A and 2B.

The RF section 52 frequency converts (downconverts) a high frequency signal supplied from the comparator 51 into a baseband signal using an oscillating frequency from the crystal oscillator 53. The RF section 52 also frequency converts (upconverts) a baseband signal supplied from the baseband processing section 54 into a high frequency signal using the oscillating frequency from the crystal oscillator 53.

The baseband processing section 54 analog-to-digital converts a baseband signal output from the RF section 52 into digital data which can be processed by the CPU 45. The baseband processing section 54 also digital-to-analog converts digital data sent thereto through the CPU bus 43 into an analog signal and transmits the analog signal to the RF section 52.

Figure 7:
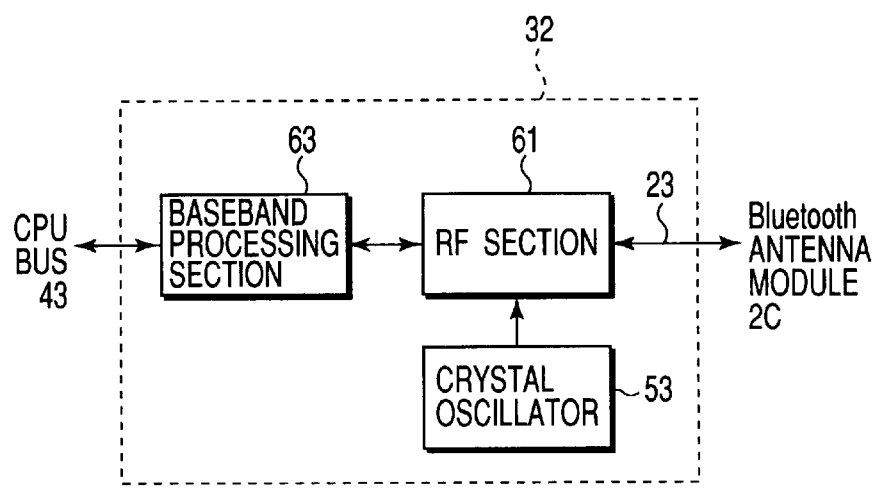
FIG. 7 is a block diagram showing the hardware of a circuit module for "Bluetooth" in FIG. 5.

FIG. 7 is a block diagram showing "Bluetooth" transmitting/receiving circuit module 32. The "Bluetooth" circuit module 32 comprises an RF section 61, a crystal oscillator 62, and a baseband processing section 63.

The RF section 61 downconverts a high frequency signal from "Bluetooth" antenna 2C into a baseband signal using an oscillating frequency from the crystal oscillator 62. The RF section 61 also upconverts a baseband signal output from the baseband processing section 63 into a high frequency signal using the oscillating frequency from the crystal oscillator 62.

The baseband processing section 63 analog-to-digital converts a baseband signal output from the RF section 61 into digital data which can be processed by the CPU 45. The baseband processing section 63 also digital-to-analog converts digital data sent thereto through the CPU bus 43 into an analog signal and transmits the analog signal to the RF section 61.

Next, the operation of the notebook type personal computer according to the second embodiment will be described.

When data is transmitted from the wireless LAN antennas 2A and 2B, the CPU 45 first stores transmission data in the memory 44, and then transmits the transmission data stored in the memory 44 to the wireless LAN transmitting/receiving circuit module 31 through the CPU bus 43.

In the wireless LAN circuit module 31, the transmission data is digital-to-analog converted by the baseband processing section 54 into analog baseband transmission signal, and the analog baseband transmission signal is output to the RF section 52. The RF section 52 converts the baseband transmission signal into transmission signal at a high frequency (2.4 GHz to 2.5 GHz) for use in wireless LAN communication with the oscillating frequency from the crystal oscillator 53, and outputs the high frequency signal to the comparator 51.

The comparator 51 outputs the high frequency signal from the FR section 52 to the wireless LAN antennas 2A and 2B through the coaxial cables 21 and 22. In this manner, the transmission signal is transmitted from the wireless LAN antennas 2A and 2B.

On the other hand, a radio signal is received by the wireless LAN antennas 2A and 2B, two high frequency signals are input from the wireless LAN antennas 2A and 2B to the comparator 51.

In response to the input of the two high frequency signals, the comparator 51 selects one of them at a higher level and outputs the selected one to the RF section 52. The RF section 52 downconverts the signal output from the comparator 51 into a baseband signal using the oscillating frequency from the crystal oscillator 52, and outputs the baseband signal to the baseband processing section 54.

The baseband processing section 54 analog-to-digital converts the signal output from the RF section 52 into digital data which can be processed by the CPU 45, and outputs the digital data to the CPU bus 43. The received data output to the CPU bus 43 is stored in the memory 44.

Next, description will be made on transmission of data from "Bluetooth" antenna 2C.

In this case, the CPU 45 first stores transmission data in the memory 44 and then transmits the transmission data stored in the memory 44 to "Bluetooth" transmitting/receiving circuit module 32 through the CPU bus 43.

In "Bluetooth" transmitting/receiving circuit module 32, the transmission data is digital-to-analog converted by the baseband processing section 63 into analog baseband transmission signal, and the analog signal is output to the RF section 61. The RF section 61 converts the baseband transmission signal into a high frequency transmission signal conforming to "Bluetooth" scheme using the oscillating frequency from the crystal oscillator 62, and outputs the transmission signal to "Bluetooth" antenna 2C through the coaxial cable 23. In this manner, the transmission signal is transmitted from "Bluetooth" antenna 2C.

On the other hand, when a radio signal is received by "Bluetooth" antenna 2C, a signal from "Bluetooth" antenna 2C is first input to the RF section 61.

The RF section 61 downconverts the signal from "Bluetooth" antenna 2C into a baseband signal using the oscillating frequency from the crystal oscillator 62, and outputs the baseband signal to the baseband processing section 63.

The baseband processing section 63 analog-to-digital converts the signal output from the RF section 61 into digital data which can be processed by the CPU 45, and outputs the digital data to the CPU bus 43. The received data output to the CPU bus 43 is stored in the memory 44.

Figure 8:
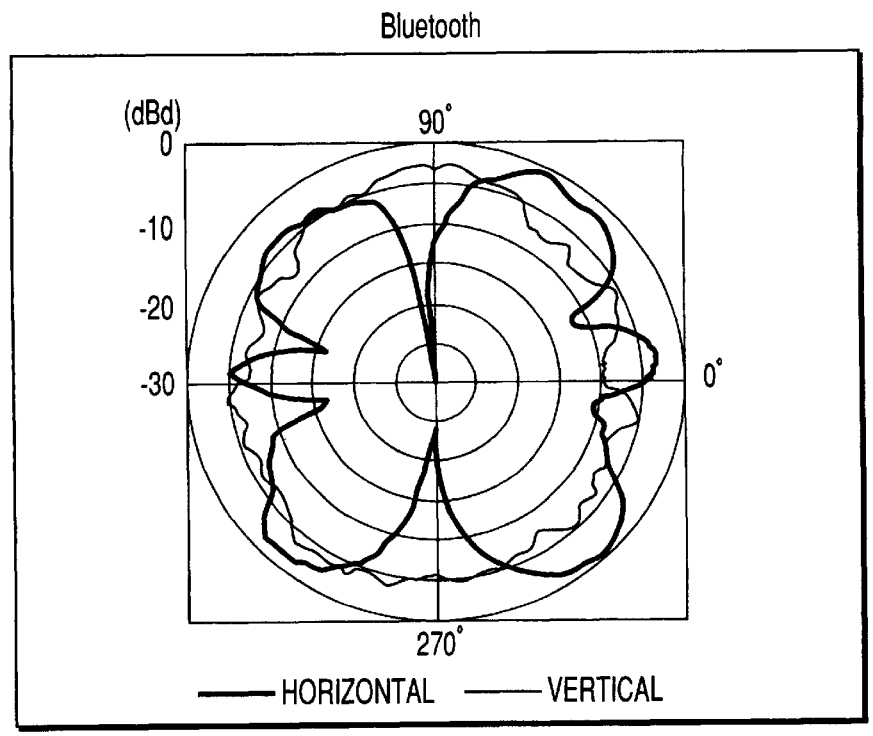
FIG. 8 is a diagram showing the radiation characteristic of the antenna for "Bluetooth" of the notebook type personal computer shown in FIG. 4.
Figure 9:
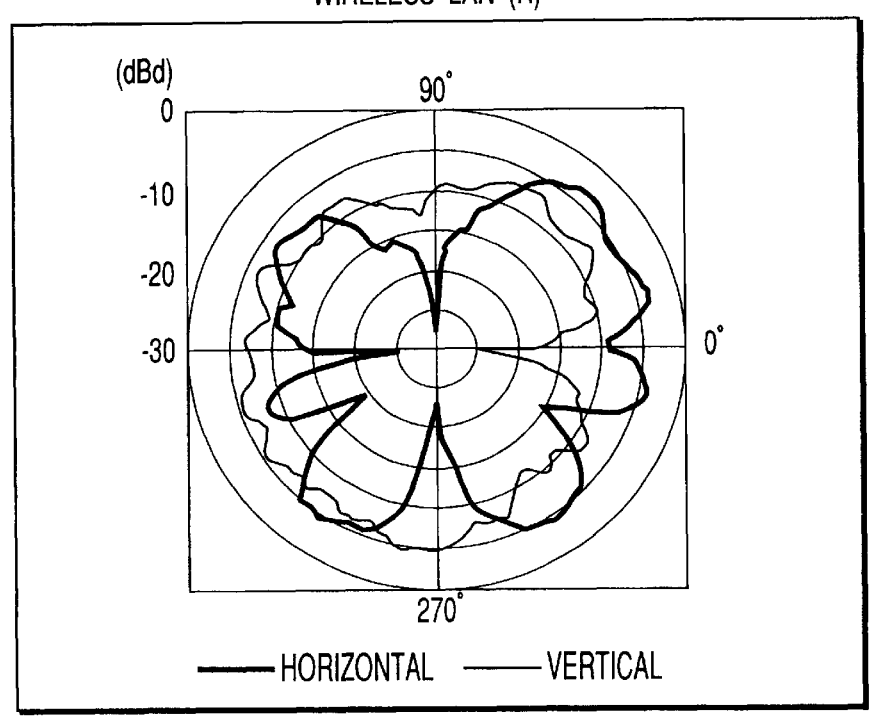
FIG. 9 is a diagram showing the radiation characteristic of the right-hand antenna for the wireless LAN of the notebook type personal computer shown in FIG. 4.
Figure 10:
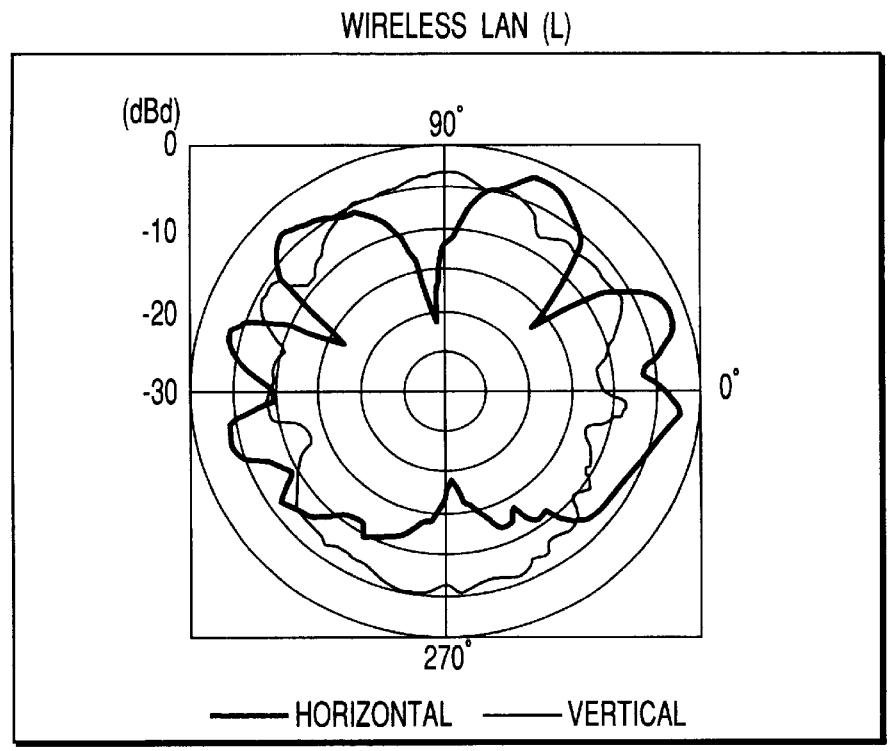
FIG. 10 is a diagram showing the radiation characteristic of the left-hand antenna for the wireless LAN of the notebook type personal computer shown in FIG. 4.

FIGS. 8 to 10 show the radiation characteristics of three antennas mounted as shown in FIG. 4. FIG. 8 shows the radiation characteristic of "Bluetooth" antenna 2C, FIG. 9 shows the radiation characteristic of the wireless LAN antenna 2B on the right in FIG. 4, and FIG. 10 shows the radiation characteristic of the wireless LAN antenna 2A on the left in FIG. 4. The angles are assumed such that the front of the display surface is at 0°, the right is at 90°, and the left is at 270°. As shown in FIGS. 8 to 10, all the antennas can produce favorable radiation characteristics. Particularly, the radiation characteristics of vertically polarized waves have no dip and are almost non-directional. The left and right antennas have stronger radiation in the central portion of the housing than in the end portion because a high frequency current passes through the housing which serves as a portion of the antenna to produce radiation. Thus, when the housing is formed of plastic rather than a magnesium alloy, a conductive coating is preferably applied thereto.

As described above, it goes without saying that the second embodiment provides advantages similar to those of the first embodiment, and moreover, the second embodiment advantageously can ensure a sufficient distance between a pair of diversity antennas to produce a desired diversity effect. Since the one antenna for "Bluetooth" scheme can be placed in a portion near the center of the housing to obtain a balanced non-directional characteristic with less difference on the left and right.

Since the portion of the substrate having the antenna element thereon is folded toward the display unit, the antenna element can be mounted compactly onto the end portion of the housing of the display unit.

Since the main body contains the wireless communication circuit modules which are connected to the antenna sections through the signal wires passing through the hinge connecting the main body with the display unit, only the antenna section may be mounted on the display unit, and the display unit is not increased in thickness or weight.

Third Embodiment

Figure 11:
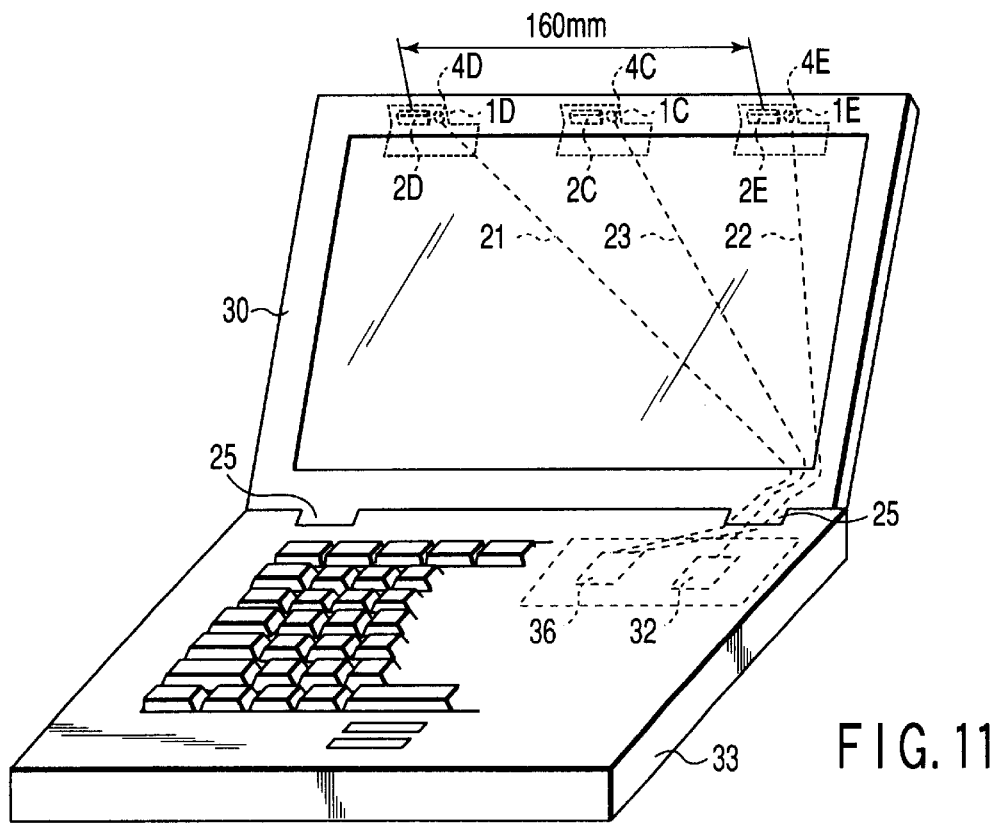
FIG. 11 is a perspective view showing a notebook type personal computer according to a third embodiment of the present invention in which the antenna of the first embodiment is implemented as antennas of IEEE 802.11a scheme, and an antenna for "Bluetooth."

FIG. 11 shows a notebook type personal computer as the third embodiment of the present invention which contains a plurality of antennas for accommodating a plurality of wireless communication schemes. As the plurality of communication schemes, described herein are the wireless LAN IEEE 802.11a scheme for a band of 5 GHz and "Bluetooth" scheme which is a short-distance wireless communication scheme. For IEEE 802.11a scheme, two antennas are used to provide a diversity antenna for reducing the influence of reflected waves.

The liquid crystal display unit 30 is pivotally attached to the distal end of the main body 33 of the notebook type personal computer through the hinge 25. Three FPC substrates 1D, 1C, and 1E are mounted in an end portion within a housing of the display unit 30 (the upper end of the liquid crystal panel). The FPC substrates 1D and 1E have diversity antennas 2D and 2E of IEEE 802.11a mounted thereon, respectively, while the FPC substrate 1C has a "Bluetooth" antenna 2C mounted thereon. In other words, the FPC substrate 1C for "Bluetooth" antenna is disposed between the FPC substrates 1D and 1E for IEEE 802.11a antennas. The FPC substrates 1D, 1C, and 1E are mounted in such a manner as shown in FIGS. 2 and 3. A magnesium alloy or the like may be used as a material of both housings of the main body 33 and the display unit 30.

The third embodiment allows the simultaneous use of two wireless communication schemes since they use different frequencies. Interference is less likely to occur with larger distances present among the three antennas. The distance between the antennas 2D and 2E for IEEE 802.11a is larger than $(3/4)\lambda$ and equal to $\{(2n+1)/4\}\lambda$ ($n=1, 2, 3, \ldots$) to produce the diversity effect and reduce interference between the antennas. Considering those conditions, $n=4, n=5, \ldots n=9$ are desirable for an A4-sized notebook type personal computer, and $n=4, n=5, \ldots n=8$ are desirable for a B5-sized notebook type personal computer.

In FIG. 11, two antennas 2D and 2E are spaced from each other with a distance of approximately 160 mm ($n=5$ at 5 GHz) between them.

Since "Bluetooth" which is a short-distance radio communication scheme provides a low-cost radio communication function and thus a diversity function for a wireless LAN or the like is omitted in the standard, only one antenna 2C is mounted. The antenna 2C is desirably placed in a central portion of the housing to realize a non-directional characteristic. For this reason, as shown in FIG. 11, "Bluetooth" antenna 2C is disposed between two wireless LAN antennas 2D and 2E.

Radio transmitting/receiving circuit modules in accordance with the respective communication schemes are realized as mini PCI cards. Specifically, a wireless LAN transmitting/receiving circuit module 36 and the "Bluetooth" transmitting/receiving circuit module 32 are contained in the main body 33. The coaxial cables 21, 22, and 23 have one ends connected to coaxial connectors 4D, 4E, and 4C on the FPC substrates 1D, 1E, and 1C, respectively, and the other ends connected to the transmitting/receiving circuit modules 36 and 32 through the hinge 25. Such a configuration allows the thick circuit modules to be contained in the main body to realize a reduced thickness of the housing of the display unit 30 on which the antennas are mounted.

As described above, it goes without saying that the third embodiment provides advantages similar to those of the first embodiment, and moreover, the third embodiment advantageously can ensure a sufficient distance between the antennas, reduce interference between the antennas, and sufficiently exert a diversity effect of the wireless LAN antennas.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, an electronic device on which the antennas are mounted is not limited to a notebook type personal computer, and a desktop personal computer, a portable information terminal, an electronic notepad and the like may be used. The respective embodiments may be implemented in combination as appropriate where possible, in which case a combination of the advantages can be obtained. The aforementioned embodiments include the inventions in various steps, and various inventions may be extracted from an appropriate combination of a plurality of disclosed requirements. For example, even if several requirements are removed from all the requirements shown in the embodiments, the resulting configuration from which the requirements have been removed may be extracted as the invention when the configuration can solve at least one of the problems described in the Description of the Related Art and produce at least one of the advantages described herein.

What is claimed is:

1. An electronic device, comprising:
    a display unit; and
    an antenna arranged in a housing of said display unit and comprising a pair of diversity antenna modules of a first wireless communication scheme placed near left and right ends of said display unit, and an antenna module of a second wireless communication scheme placed between said pair of diversity antenna modules, each of said antenna modules comprising a substrate and an antenna element arranged on said substrate, an antenna portion of said substrate having said antenna thereon projecting from an upper end of said display unit and being folded toward a front side of said display unit.

2. The electronic device according to claim 1, wherein a remaining portion of said substrate except for said antenna portion is provided along a back of said display unit.

3. The electronic device according to claim 1, wherein said first wireless communication scheme is a wireless local area network scheme and said second wireless communication scheme is a short-distance wireless communication scheme.

4. The electronic device according to claim 1, wherein said first wireless communication scheme is a wireless local area network scheme, and said second wireless communication scheme is a short-distance wireless communication scheme.

5. The electronic device according to claim 1, further comprising:
    a main body containing wireless communication circuit module and connected to said display unit through a hinge; and
    a signal wire connecting said wireless communication circuit module with said antenna portion and passing through said hinge.

6. The electronic device according to claim 1, wherein said substrate comprises a terminal in said antenna portion which connects said antenna with a separate circuit module.

7. The electronic device according to claim 1, wherein said substrate comprises a reinforcing plate which reinforces said antenna portion.

8. The electronic device according to claim 1, wherein said substrate comprises a printed board formed with a conductive pattern for ground.

9. The electronic device according to claim 1, wherein said substrate comprises a printed board formed with a conductive pattern for ground having a total perimeter of 0.7 to 1.4 wavelengths.

10. The electronic device according to claim 1, wherein said antenna comprises a chip antenna containing a helical antenna pattern within an insulating chip.

11. The electronic device according to claim 1, wherein said antenna portion is made of polyimide.

12. The electronic device according to claim 1, wherein said substrate is a flexible substrate.

13. The electronic device according to claim 1, wherein the substrate comprises a flexible portion connecting the antenna portion and the remaining portion.

14. An electronic device comprising:
    a display unit including a display panel and a housing containing said display panel; and
    an antenna module arranged in the housing of said display unit and including a substrate and an antenna arranged on an antenna portion of said substrate, said substrate being flexible at least at a boundary between the antenna portion and a remaining portion being provided along a back of said display panel, and said antenna portion projecting from an end of said display panel.

15. The electronic device according to claim 14, wherein said antenna portion of said substrate is folded toward a front side of said display panel.

16. The electronic device according to claim 15, wherein an end of said housing is rounded in accordance with a shape of said substrate folded toward the front side.

17. The electronic device according to claim 14, wherein said housing is formed of a conductive material.

18. An electronic device comprising:
    a display unit including a display panel and a housing containing said display panel; and
    an antenna module arranged in the housing of said display unit and including a substrate and an antenna arranged on an antenna portion of said substrate, a remaining portion being provided along a back of said display panel, and said antenna portion projecting from an end of said display panel and being folded toward a front side of said display unit.

19. The electronic device according to claim 18, wherein an end of said housing is rounded in accordance with a shape of said substrate folded toward the front side.

20. The electronic device according to claim 18, wherein said housing is formed of a conductive material.

21. The electronic device according to claim 18, wherein said substrate comprises a terminal in said antenna portion which connects said antenna with a separate circuit module.

22. The electronic device according to claim 18, wherein said substrate comprises a reinforcing plate which reinforces said antenna portion.

23. The electronic device according to claim 18, wherein said substrate comprises a printed board formed with a conductive pattern for ground.

24. The electronic device according to claim 18, wherein said substrate comprises a printed board formed with a conductive pattern for ground having a total perimeter of 0.7 to 1.4 wavelengths.

25. The electronic device according to claim 18, wherein said antenna comprises a chip antenna containing a helical antenna pattern within an insulating chip.

26. The electronic device according to claim 18, wherein said antenna portion is made of polyimide.

27. The electronic device according to claim 18, wherein said substrate is a flexible substrate.

28. The electronic device according to claim 18, the wherein substrate comprises a flexible portion connecting the antenna portion and the remaining portion.

29. An electronic device comprising:
a display unit including a display panel and a housing containing said display panel; and
an antenna module arranged in the housing of said display unit and including a flexible substrate and an antenna arranged on an antenna portion-of said substrate, a remaining portion being provided along a back of said display panel, and said antenna portion projecting from an end of said display panel.

30. The electronic device according to claim 29, wherein an end of said housing is rounded in accordance with a shape of said substrate folded toward a front side of said display panel.

31. The electronic device according to claim 29, wherein said housing is formed of a conductive material.

32. The electronic device according to claim 29, wherein said substrate comprises a terminal in said antenna portion which connects said antenna with a separate circuit module.

33. The electronic device according to claim 29, wherein said substrate comprises a reinforcing plate which reinforces said antenna portion.

34. The electronic device according to claim 29, wherein said substrate comprises a printed board formed with a conductive pattern for ground.

35. The electronic device according to claim 29, wherein said substrate comprises a printed board formed with a conductive pattern for ground having a total perimeter of 0.7 to 1.4 wavelengths.

36. The electronic device according to claim 29, wherein said antenna comprises a chip antenna containing a helical antenna pattern within an insulating chip.

37. The electronic device according to claim 29, wherein said antenna portion is made of polyimide.

38. The electronic device according to claim 29, wherein said substrate is a flexible substrate.

39. The electronic device according to claim 29, wherein the substrate comprises a flexible portion connecting the antenna portion and the remaining portion.

40. An electronic device comprising:
a display unit; and
an antenna arranged in a housing of said display unit and comprising a pair of diversity antenna modules of a first wireless communication scheme placed near left and right ends of said display unit, and an antenna module of a second wireless communication scheme placed between said pair of diversity antenna modules, each of said antenna modules comprising a substrate and an antenna element arranged on said substrate, the substrate comprising an antenna portion having said antenna thereon and a remaining portion, the antenna portion projecting from an upper end of said display unit, and a distance between the antenna portion and the housing being larger than a distance between the remaining portion and the housing.

41. An electronic device comprising:
a display unit including a display panel and a housing containing said display panel; and
an antenna module arranged in the housing of said display unit and comprising a substrate and an antenna element arranged on said substrate, the substrate comprising an antenna portion having said antenna thereon and a remaining portion, the antenna portion projecting from an upper end of said display unit, and a distance between the antenna portion and the housing being larger than a distance between the remaining portion and the housing.

42. An electronic device comprising:
a display unit including a display panel and a housing containing said display panel; and
an antenna module arranged in the housing of said display unit and comprising a flexible substrate and an antenna element arranged on said substrate, the substrate comprising an antenna portion having said antenna thereon and a remaining portion, the antenna portion projecting from an upper end of said display unit, and a distance between the antenna portion and the housing being larger than a distance between the remaining portion and the housing.

\* \* \* \* \*

UNITED STATES PATENT AND TRADEMARK OFFICE
CERTIFICATE OF CORRECTION

PATENT NO. : 6,642,892 B2
DATED : November 4, 2003
INVENTOR(S) : Masaki et al.

It is certified that error appears in the above-identified patent and that said Letters Patent is hereby corrected as shown below:

<u>Column 13,</u>
Lines 1-2, change "the wherein" to -- wherein the --.
Line 10, change "portion-of" to -- portion of --.

Signed and Sealed this

Sixth Day of January, 2004

JAMES E. ROGAN
*Director of the United States Patent and Trademark Office*